(12) United States Patent
Altuev

(10) Patent No.: US 10,990,827 B2
(45) Date of Patent: Apr. 27, 2021

(54) IMPORTED VIDEO ANALYSIS DEVICE AND METHOD

(71) Applicant: OOO ITV Group, Moscow (RU)

(72) Inventor: Murat K. Altuev, Moscow (RU)

(73) Assignee: OOO ITV Group, Moscow (RU)

( * ) Notice: Subject to any disclaimer, the term of this patent is extended or adjusted under 35 U.S.C. 154(b) by 55 days.

(21) Appl. No.: 16/377,130

(22) Filed: Apr. 5, 2019

(65) Prior Publication Data

US 2020/0074183 A1 Mar. 5, 2020

(30) Foreign Application Priority Data

Aug. 29, 2018 (RU) .......................... RU2018131164

(51) Int. Cl.
*G06K 9/00* (2006.01)
*G06F 16/783* (2019.01)
(Continued)

(52) U.S. Cl.
CPC ......... *G06K 9/00744* (2013.01); *G06F 16/71* (2019.01); *G06F 16/735* (2019.01); *G06F 16/784* (2019.01); *G06K 9/00228* (2013.01); *G06K 9/00771* (2013.01); *G06K 9/6253* (2013.01); *G06T 7/20* (2013.01);
(Continued)

(58) Field of Classification Search
CPC ...... G06F 16/71; G06F 16/735; G06F 16/784; G06K 2009/00738; G06K 2209/15; G06K 2209/27; G06K 9/00228; G06K 9/00744; G06K 9/00771; G06K 9/6253; G06T 2207/10016; G06T 2207/30196; G06T 2207/30232; G06T 2207/30252; G06T 7/20; G06T 7/90
See application file for complete search history.

(56) References Cited

U.S. PATENT DOCUMENTS

| | | |
|---|---|---|
| 6,718,336 B1 | 4/2004 | Saffer et al. |
| 7,460,149 B1 | 12/2008 | Donovan et al. |
| 2008/0297599 A1* | 12/2008 | Donovan ............. G11B 27/329 348/143 |

FOREIGN PATENT DOCUMENTS

RU  2471231 C1  12/2012

OTHER PUBLICATIONS

Bescos, Berta, et al. "DynaSLAM: Tracking, mapping, and inpainting in dynamic scenes." IEEE Robotics and Automation Letters 3.4 (2018): 4076-4083. (Year: 2018).*

* cited by examiner

*Primary Examiner* — Nirav G Patel
(74) *Attorney, Agent, or Firm* — IRL Legal Services, LLC; Ilya R. Lapshin

(57) ABSTRACT

The invention relates to the area of computer vision video data analysis, in particular to the technologies aimed to search the required objects or events in the analyzed video originally received from a third-party device. An imported video analysis device consists of memory, database for metadata storage, a graphical user interface, and a data processing module. The data processing module is configured to upload a video in any available format into the memory and to import the uploaded video into software of the imported video analysis device. Software decompresses and analyzes the imported video to generate metadata characterizing the data in all objects in the video and to save the metadata in database. The search speed for the required event or object in the imported video received from a third-party device is increased.

31 Claims, 1 Drawing Sheet

(51) Int. Cl.
  *G06F 16/71* (2019.01)
  *G06F 16/735* (2019.01)
  *G06K 9/62* (2006.01)
  *G06T 7/20* (2017.01)
  *G06T 7/90* (2017.01)
(52) U.S. Cl.
  CPC .............. *G06K 2009/00738* (2013.01); *G06K 2209/15* (2013.01); *G06K 2209/27* (2013.01); *G06T 7/90* (2017.01); *G06T 2207/10016* (2013.01); *G06T 2207/30196* (2013.01); *G06T 2207/30232* (2013.01); *G06T 2207/30252* (2013.01)

IMPORTED VIDEO ANALYSIS DEVICE AND METHOD

RELATED APPLICATIONS

This application claims priority to Russian Patent Application No. RU 2018131164, filed Aug. 29, 2018, which is incorporated herein by reference in its entirety.

FIELD OF THE INVENTION

The invention relates to the computer vision video analysis, in particular, to the technologies for search for specific objects and events in the processed video originally received from a third-party device.

BACKGROUND

Computer vision video analysis imposes strict requirements on equipment performance and, therefore, high equipment costs. As a result, many existing surveillance systems contain the cheapest devices for video recording, these devices lack means and capacities to process the recorded video with the necessary accuracy and speed.

The main objective of the claimed technical solution is to provide a fast search for an event or object of interest in a video if its specific time or the specific object is not known. In the context of prior art an operator of such a system had to look through the video archive and to identity the required events to solve this task; this takes a lot of time and lacks high accuracy of results. On the other hand, the task could be solved by buying more advanced and more expensive equipment capable of analyzing the video and performing a search quickly and with high quality, although this is not financially feasible, especially when the search task arises not very often, or when a company has not enough money to upgrade all its surveillance systems.

The state of the art provides a solution disclosed in the U.S. Pat. No. 6,718,336 B1, issued Apr. 6, 2004, which describes a data import system with access to the data of several types from several data sources and an interface for data import into a data analysis system. The interface helps the user to adjust the data formatting as the data is imported to the data analysis system. The user can select the first user parameters to work with the first set of data received during data import.

Although his technology defines the data import for further analysis, this solution is generic for any data and does not provide for the analysis of video data for event or object searches in the received analyzed data.

By its technical nature, the closest solution is disclosed in the U.S. Pat. No. 7,460,149 B1, issued Dec. 2, 2008, which describes a surveillance system consisting of a surveillance video camera to capture the video; one or several locations for storing the video data; metadata storage; attribute storage and a processor configured for executing computer code capturing video data from one or several surveillance video cameras to generate the metadata by video analysis of the video data from the surveillance cameras; to weigh the attributes providing information about the relevance of metadata; to store the video data in video storage area; to store metadata indexed by date and time for video data in the metadata storage area; and to store the weights of the attributes in attribute storage area. Besides, this solution also describes a method of searching and extracting video data from a surveillance system, and this method contains the entry of the search criteria; search of metadata connected with the video data; receiving the metadata corresponding to the search criteria from the metadata module; extraction of video data indexed by metadata from a video storage module.

A disadvantage of this group of inventions is impossibility of importing the video into a specialized software for further analysis. So, in this case the problem is not about the lack of capacity to search with the existing equipment, and, therefore, all the operations are not performed with pre-imported video from a simpler system.

BRIEF SUMMARY

The claimed technical solution is aimed at overcoming the disadvantages typical for the known equipment and to improve the known solutions.

A technical result of the claimed group of inventions is an increased speed of searching for a particular event or an object in an imported video from a third-party device.

This technical result is achieved by a device for analysis of an imported video containing memory with the capacity to store data; database to store metadata; a graphical user interface; at least one data processing module configured to upload a video in a popular format into a memory, and this video should be recorded by a third-party image capture device; to import the uploaded video to software to process the imported video, and this software helps a device for the imported video analysis to decompile and to process the imported video for formatting metadata characterizing data about all objects in the video and for recording the above mentioned metadata into the database; to receive a request from a user through a graphical user interface or through application programming interface (API), as well as search parameters and/or criteria, for search of at least one event or an object in the video; to search for at least one requested event or an object in the processed video with the application of the generated metadata and search parameters and/or criteria set by users.

The specified technical result is also achieved by a method of analyzing the imported video, this method is embodied by at least one data processing module, and the method contains the stages when the video is uploaded in an available format into the memory, and the mentioned video should be recorded by a third-party image capture device; the uploaded video is imported into the software for the analysis of the imported video; the mentioned software decompiles and processes the imported video to generate metadata characterizing the data about all objects in the video and to store the mentioned metadata in the database; a request from a user, as well as search parameters and/or criteria are applied through a graphical user interface or through application programming interface (API), to search for at least one event or an object in the video; at least one user requested event or object is searched for in the analyzed video with the application of the generated metadata and search parameters and/or criteria set by a user.

According to one embodiment of the invention, a video camera or a network video recorder (NVR) is a third-party image capture device.

According to Another embodiment of the invention, once the uploaded video is imported into the software, a time tag attaches this video to a particular time.

According to another embodiment of the invention, a time tag could be the name of the uploaded video if it is specified in ISO 8601 format or a creation date for the uploaded video.

According to another embodiment of the invention, when the video is uploaded, a folder with several videos could be added, and if the name of the folder contains a time tag, then it will be a time tag for the first video in an alphabetic order in the specified folder.

According to another embodiment of the invention, video is imported, decompressed, and processed upon the request from a user or by schedule, or in a real time upon receiving the data to store in the memory.

Another embodiment of the invention, wherein all uploaded video or a particular time period is searched through.

Another embodiment of the invention, wherein the search is based on the algorithm of visual search of the events or objects in the archive which is based on displaying synthetic frames each of which could combine several objects registered in different original frames.

Another embodiment of the invention, wherein the search is performed by the faces with the application of face recognition algorithm.

Another embodiment of the invention, wherein the search is performed by a license plate.

Another embodiment of the invention, wherein moving objects are searched for.

Another embodiment of the invention, wherein the search criteria are at least one of movements of at least one object in a particular area; a long occupancy of at least one object in a particular area; parallel occupancy of N objects in a particular area when N is higher than numbers preset by a user.

Another embodiment of the invention, wherein a search criterion of moving objects is a transfer of at least one object from one set area into another or crossing a line preset by a user in video data by at least one object.

Another embodiment of the invention, wherein prior search one could additionally set filtration by one or several parameters of the moving objects.

Another embodiment of the invention, wherein the parameters of the moving objects are movement direction, maximum and minimum size of an object, maximum and minimum speed of object movement, color of the object, type of an object.

Another embodiment of the invention, wherein the types of objects include a person, a group of people, a transportation vehicle, or an item left unattended.

This technical result is also achieved by to a computer read data medium with the instructions for imported video analysis method alternatives executed by computer CPU.

DETAILED DESCRIPTION

Possible embodiments for the claimed group of inventions are described below. However, the claimed group of inventions is not limited to these embodiments. It is apparent to those skilled in the art that the claimed group of inventions cover other embodiments.

The claimed technical solution in its different alternatives could be embodied as a device and method for imported video analysis, as well as a computer-readable data medium.

Figure 1:
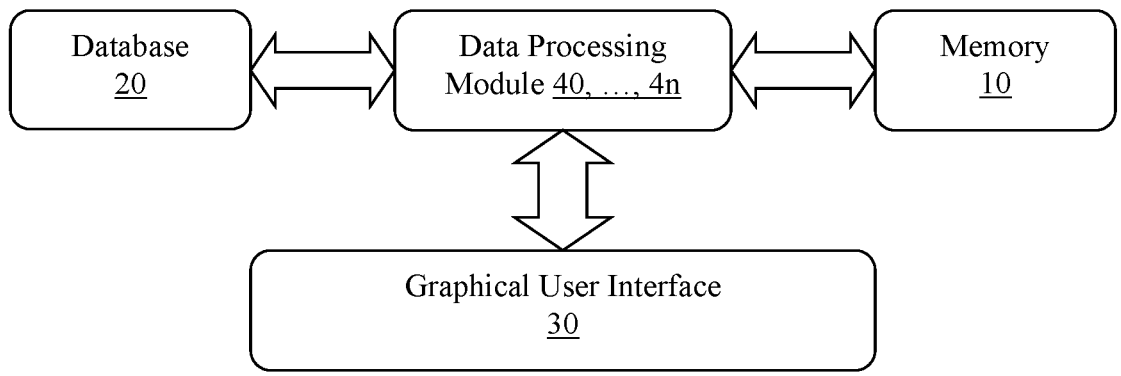
FIG. 1 is a flow chart of a video analysis device.

FIG. 1 shows a flow chart of one embodiment processing an imported video. The device's basic configuration includes a memory module (10), a database for storing metadata (20); a graphical user interface (GUI) (30); and at least one data processing module (40, . . . , 4n).

In this document, a data processing module means any computational device based on software and hardware, for example, personal computers, smartphones, laptops, tablets, etc.

A data processing module may be a processor, a microprocessor, a computer, a programmable logic controller (PLC), or an integrated circuit configured to execute data processing commands (instructions, applications). A processor may be multi-core for parallel data processing.

A memory device may be, but not limited to, a hard disk drive (HDD), a flash drive, read-only memory (ROM), a solid state drive (SSD), etc.

A graphical user interface is a system enabling a user to interact with a computation device and providing access to all available system objects and functions in the form of graphical screen elements (windows, icons, menus, lists, buttons, etc.) to the user. The user has a direct access to all visible screen objects as interface blocks on the display.

It should be noted that this device could include any known devices, such as sensors, data input/output devices, display devices (screens), etc.

A data input/output device could be, but not limited to, for example, a mouse pointing device, a keyboard, a touchpad, a stylus, a joystick, a track pad, etc.

An example of how the abovementioned device processes an imported video will be described below.

For example, there is an enterprise with a security system consisting of several simple image capture devices located over a protected area. An image capture device could be a video camera or a network video recorder (NVR). These devices record video data and save it in their memory.

If an operator of this security system needs to identify when a person enters the territory and to receive the video data showing this person's actions on the territory, then the operator has to look through the entire video archive. However, this approach is time consuming; therefore, the probability of capturing this person is small. In case of a theft, the time factor is crucial. In such a case, the operator of the security system has to perform the video analysis using faster computer vision methods. Since the security system of this enterprise does not have the necessary devices for video data analysis, the enterprise contacts a software supplier and purchases the required software enabling the operator to upload and to process the video in a fast and accurate manner.

Once the software is downloaded and installed on a computer, the operator of the security system uploads the video originally received from the image capture device in any available format (for example, AVI, MPEG, MKV, etc.) into the memory of the device. The downloaded video processing tool and the image capture device are not necessarily connected. The video could be uploaded from any device.

Then the uploaded video is imported into the application of the tool for further analysis. This video is associated with a particular time by a time tag. A time tag could be the creation date of uploaded video. Alternatively, the name of the uploaded video could be a time tag, for example, in ISO 8601 format (YYYYMMDDTHHMMSS).

For example, if the name of a video file is 20160719T100000.avi, the video is associated with the time interval of: Jul. 19, 2016, 10:00:00—Jul. 19, 2016, 10:00:00+video length (T).

The user may create a folder with several videos when uploading the video, and if the folder name contains a time tag, it would be the time tag for the first video in an alphabetical order within the folder.

Then the application decompresses and processes the imported video to generate metadata containing information about objects in the video. In one case, the metadata comprise detailed information about all objects moving within the view of the image capture device (movement trajectories, face parameters, recognized car license plates, etc.). The produced metadata are saved in the database. The metadata can be used for an unlimited number of search operations.

The video can be imported, decompressed, and processed upon a user's request, or at scheduled times defined by the user, or in the real time once the data enter the memory.

The next stage is to receive a request from a user. This request is received by the device through a graphical user interface or through an application programming interface (API)—in this case the user is another system.

At this stage, a user specifies what to look for: particular events or objects in the video. For example, the user wants to find the time of the theft in the video data. The user does not know who committed the theft and when it took place. Then the user sets the search parameters and/or criteria. Fast performance of the device allows to do the search several times by modifying the search parameters and/or criteria for more accurate results.

Then the imported video processing device searches for at least one user requested event or object in the processing video by applying previously generated metadata and/or search criteria set by a user. The first search results appear on the screen in several seconds after the search starts.

The search may be done over the entire uploaded video or over a particular interval in the video could be searched, if the user specifies it as a search parameter. This alternative is relevant if the user is sure that the theft took place, for example, between 6:00 p.m. and 11:30 p.m. This time interval includes the times when the protected object was at its place and when it was found to be missing. A limited time interval search is quicker than a whole video search.

The claimed solution allows carrying out the search by any available devices and methods capable of improving the search rate. For example, a face search may be used. In this case, a face recognition algorithm is used. Or the user can perform a search by car license plates by using a recognition algorithm and/or verification/comparison algorithm.

The search for events or objects in the video archive may be performed using a visual search algorithm based on using synthetic frames, such frames combine objects detected in different original frames. Details and specific characteristics of this algorithm are disclosed in the Russian Patent RU 2,471,231 C1, published Dec. 27, 2012, which is incorporated herein by reference in its entirety.

However, the user often does not know which object (for example, a person or a vehicle) should be found. Hence, a moving object search is the most popular and sought-after type of search in such applications.

For this search, the user selects one of the moving object search criteria, for example:

movement of at least one object in a defined area;

duration of at least one object's presence in a defined area; or simultaneous presence of N objects in a defined area, wherein N is a positive integer greater than a user-defined number.

Some of the more specific criteria are:

movement of at least one object from one defined area to another defined area; or crossing of a user-defined line by at least one object in the video.

Also, before the search starts, the user can additionally task the search to filter search results by one or several parameters of the moving objects, wherein the parameters of the moving objects are the direction of movement, maximal and minimal size of an object, maximal and minimal speed of an object, object's color or a range of colors, object's type. The types of objects may be a person, a group of people, a vehicle, or an object left unattended.

The more criteria and parameters there are, the more accurate the search results are.

All the aforementioned actions (import, decompression, analysis, search) can be performed in parallel or on several processor cores, or on several processors, or on several servers. This approach brings faster processing rate of the analysis than the real time, and hence the waiting time for analysis completion will be short.

In summary, the software application for the analysis of the imported video can additionally reduce the costs of the required computational capacities of the processing equipment, achieving the technical result aimed at increasing the retrieval rate for a specific event or object in the imported video received from a third-party device.

Figure 2:
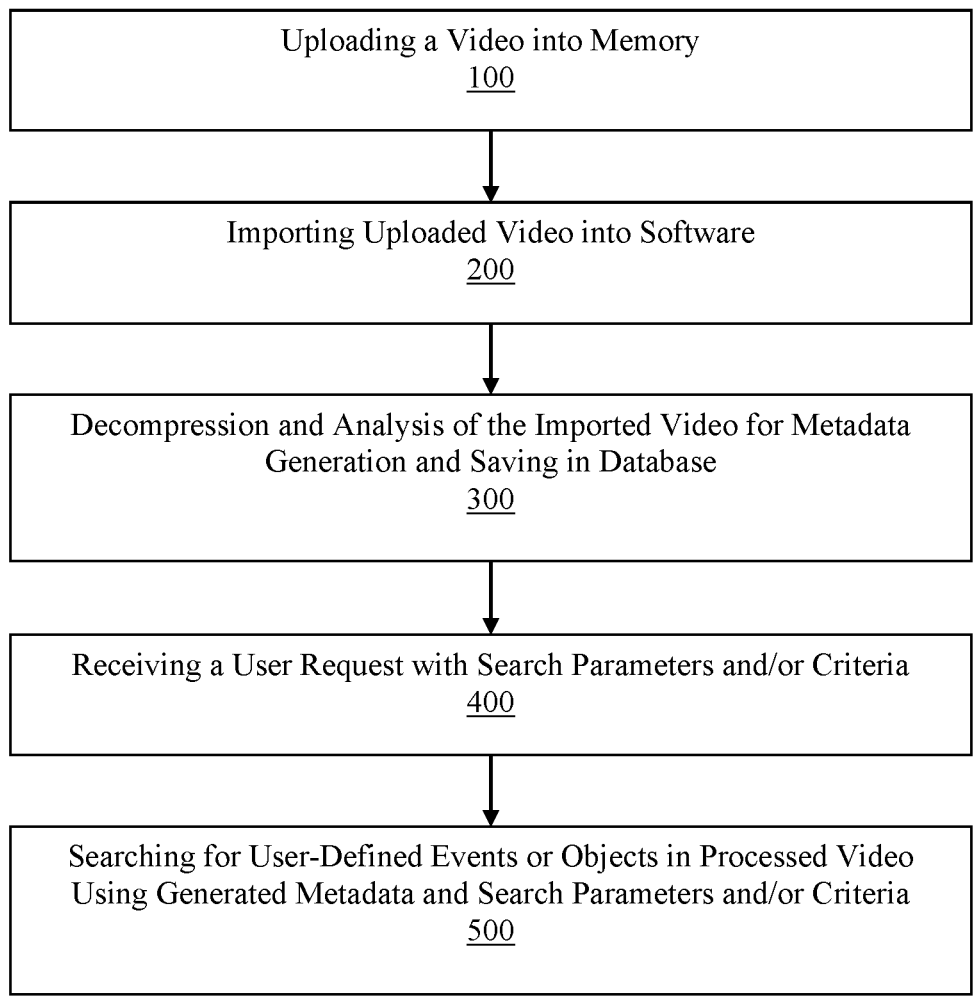
FIG. 2 is a flow chart of a video analysis method embodiment.

FIG. 2 is a flow chart of one embodiment of the imported video analysis method. This method is embodied by at least one data processing module and comprises the stages where:

(100) the video recorded by an image capture device in an available format is uploaded into the memory module;

(200) the uploaded video is imported into software running on the imported video analysis device;

(300) this software decompresses and processes the imported video to generate metadata for all objects in the video and to save these metadata in database;

(400) a request from a user with the search parameters and/or criteria for the search of at least one event or object in the video is received through a graphical user interface or application programming interface (API);

(500) a search for at least one user requested event or object in the processed video is performed by applying the generated metadata and search parameters and/or criteria defined by the user.

The method may be embodied by the imported video analysis device described above and therefore can be extended and enhanced using the embodiments described for implementation of the imported video analysis device.

The embodiments of the present group of inventions may be implemented by software, hardware, programmable logic devices, or their combination. In the example embodiments, the programmable logic devices, software, or a set of instructions are stored on one or more different traditional computer-readable data media.

In this description, a computer-readable data medium may be any medium or device which can store, contain, transfer, distribute, or transport instructions (commands) for their use (execution) by a computation device, for example, a computer, wherein the data medium could be a transitory or non-transitory computer-read data medium.

At least some of different operations described in this solution may be performed in a different order and/or in parallel.

Although this technical solution has been described in detail to illustrate the most relevant and preferable embodiments, this invention is not limited to the disclosed embodiments, and it is designed for further modification and various combinations of features different from the described embodiments. For example, the present invention permits that one or more features of any embodiments could be combined, if possible, with other one or more features of other embodiments.

The invention claimed is:

1. A video processing device comprising:
a memory module configured to store data;
a database module configured to store metadata;
a graphical user interface module; and
a processing module configured for:
uploading a video into the memory module; and
providing the video to processing software,
wherein the processing software is configured for:
processing the video to generate metadata for all objects in the video;
recording the metadata into the database module;
receiving a request from a user through the graphical user interface or through an application programming interface (API) with at least one search parameter or criterion to search for at least one event or at least one object in the video; and
searching for the at least one event or the at least one object in the video using the metadata and the at least one search parameter or criterion;
wherein the searching comprises using a visual search algorithm based on using synthetic frames combining objects detected in different original frames.

2. The device of claim 1, wherein the video is captured with a video camera or a network video recorder (NVR).

3. The device of claim 1, wherein the processing software is further configured for:
assigning a time value to the video based on a time tag associated with the video.

4. The device of claim 3, wherein the time tag is a name of the video in ISO 8601 format or a creation date of the video.

5. The device of claim 1,
wherein the processing software is further configured for receiving the video; and
wherein the video is uploaded and processed upon a request from a user, or at a scheduled time, or in a real time upon receiving the video.

6. The device of claim 1, wherein the searching comprises searching the entire video or searching a time interval within the video.

7. The device of claim 1, wherein the searching comprises using a face recognition algorithm to search for faces in the video.

8. The device of claim 1, wherein the searching comprises searching for a license plate in the video.

9. The device of claim 1, wherein the searching comprises searching for moving objects in the video.

10. The device of claim 9, wherein the at least one search criterion is:
movement of at least one moving object in a user-defined area;
duration of at least one moving object's presence in a user-defined area; or
simultaneous presence of N moving objects in a user-defined area, wherein N is a positive integer greater than a user-defined number.

11. The device of claim 9, wherein the at least one search criterion is:
movement of at least one moving object from one user-defined area to another user-defined area; or
crossing of a user-defined line by at least one moving object in the video.

12. The device of claim 9, wherein the searching comprises filtering search results by at least one parameter of a moving object.

13. The device of claim 12, wherein at least one parameter is:
the direction of movement of a moving object;
maximal or minimal size of a moving object;
maximal or minimal speed of a moving object;
a moving object's color; or
a moving object's type.

14. The device of claim 13, wherein the moving object's type is:
a person;
a group of people;
a vehicle; or
an object left unattended.

15. A video processing device comprising:
a memory module configured to store data;
a database module configured to store metadata;
a graphical user interface module; and
a processing module configured for:
uploading a video into the memory module; and
providing the video to processing software,
wherein the processing software is configured for:
processing the video to generate metadata for all objects in the video;
recording the metadata into the database module;
receiving a request from a user through the graphical user interface or through an application programming interface (API) with at least one search parameter or criterion to search for at least one event or at least one object in the video; and
searching for the at least one event or the at least one object in the video using the metadata and the at least one search parameter or criterion; wherein the uploading comprises uploading a folder with videos;
wherein a name of the folder contains a time tag; and
wherein the processing software is further configured for assigning a time value to the first video in the alphabetic order in the folder based on a time tag associated with the name of the folder.

16. A method for video processing:
uploading a video into a memory module;
providing the video to processing software;
processing the video to generate metadata for all objects in the video;
recording the metadata into a database module;
receiving a request from a user through a graphical user interface or through an application programming interface (API) with at least one search parameter or criterion to search for at least one event or at least one object in the video; and
searching for the at least one event or the at least one object in the video using the metadata and the at least one search parameter or criterion;
wherein the searching comprises using a visual search algorithm based on using synthetic frames combining objects detected in different original frames.

17. The method of claim 16, wherein the video is captured with a video camera or a network video recorder (NVR).

18. The method of claim 17, further comprising:
assigning a time value to the video based on a time tag associated with the video.

19. The method of claim 18, wherein the time tag is a name of the video in ISO 8601 format or a creation date of the video.

20. Non-transitory computer readable medium storing instructions that, when executed by a computer, cause it to perform the method of claim 16.

21. The method of claim 16,
wherein the uploading comprises uploading a folder with videos;
wherein a name of the folder contains a time tag; and
further comprising assigning a time value to the first video in the alphabetic order in the folder based on a time tag associated with the name of the folder.

22. The method of claim 16,
further comprising receiving the video; and
wherein the video is uploaded and processed upon a request from a user, or at a scheduled time, or in a real time upon receiving the video.

23. The method of claim 16, wherein the searching comprises searching the entire video or searching a time interval within the video.

24. The method of claim 16, wherein the searching comprises using a face recognition algorithm to search for faces in the video.

25. The method of claim 16, wherein the searching comprises searching for a license plate in the video.

26. The method of claim 16, wherein the searching comprises searching for moving objects in the video.

27. The method of claim 26, wherein the at least one search criterion is:
movement of at least one moving object in a user-defined area;
duration of at least one moving object's presence in a user-defined area; or
simultaneous presence of N moving objects in a user-defined area, wherein N is a positive integer greater than a user-defined number.

28. The method of claim 26, wherein the at least one search criterion is:
movement of at least one moving object from one user-defined area to another user-defined area; or
crossing of a user-defined line by at least one moving object in the video.

29. The method of claim 26, wherein the searching comprises filtering search results by at least one parameter of a moving object.

30. The method of claim 29, wherein at least one parameter is:
the direction of movement of a moving object;
maximal or minimal size of a moving object;
maximal or minimal speed of a moving object;
a moving object's color; or
a moving object's type.

31. The method of claim 30, wherein the moving object's type is:
a person;
a group of people;
a vehicle; or
an object left unattended.

\* \* \* \* \*